(12) United States Patent
Taguchi et al.

(10) Patent No.: US 9,283,917 B2
(45) Date of Patent: Mar. 15, 2016

(54) CURTAIN AIRBAG DEVICE

(75) Inventors: Hiroyuki Taguchi, Yokohama (JP);
Atsushi Nakashima, Yokohama (JP);
Yuki Nakamura, Yokohama (JP)

(73) Assignee: AUTOLIV DEVELOPMENT AB, Vargarda (SE)

(*) Notice: Subject to any disclaimer, the term of this patent is extended or adjusted under 35 U.S.C. 154(b) by 2 days.

(21) Appl. No.: 14/114,313

(22) PCT Filed: Apr. 5, 2012

(86) PCT No.: PCT/JP2012/059407
§ 371 (c)(1),
(2), (4) Date: Oct. 28, 2013

(87) PCT Pub. No.: WO2012/147490
PCT Pub. Date: Nov. 1, 2012

(65) Prior Publication Data
US 2014/0054879 A1 Feb. 27, 2014

(30) Foreign Application Priority Data
Apr. 28, 2011 (JP) .................................. 2011-101869

(51) Int. Cl.
*B60R 21/232* (2011.01)
*B60R 21/231* (2011.01)
(Continued)

(52) U.S. Cl.
CPC ......... *B60R 21/23138* (2013.01); *B60R 21/213* (2013.01); *B60R 21/232* (2013.01); *B60R 21/237* (2013.01)

(58) Field of Classification Search
CPC .. B60R 21/213; B60R 21/214; B60R 21/232; B60R 21/237; B60R 21/23138

USPC ...................... 280/728.1, 728.2, 730.2, 743.1
See application file for complete search history.

(56) References Cited

U.S. PATENT DOCUMENTS

| | | | | |
|---|---|---|---|---|
| 5,884,937 A | * | 3/1999 | Yamada | 280/730.2 |
| 5,941,564 A | * | 8/1999 | Acker | B60R 21/23184 |
| | | | | 280/733 |
| 6,361,068 B1 | * | 3/2002 | Stein et al. | 280/730.2 |

(Continued)

FOREIGN PATENT DOCUMENTS

CN         1550379 A     12/2004
DE  11 2004 000 671 T5   4/2006
(Continued)

OTHER PUBLICATIONS

Machine translation of JP 2007-296928.*
(Continued)

*Primary Examiner* — Barry Gooden, Jr.
(74) *Attorney, Agent, or Firm* — Brinks Gilson & Lione

(57) ABSTRACT

A curtain airbag device that can be applied to a small-width pillar. The curtain airbag device is accommodated in a region extending from at least an A-pillar to an upper portion of a window frame, and includes an airbag that is deployed in a curtain form near a side window of a vehicle interior in order to protect an occupant; and a gas generator that supplies inflation gas to the airbag. The accommodated airbag is formed in a rod shape by being folded in a roll form. When the airbag is accommodated, the airbag is partially compressed toward the center of the airbag at a narrow portion where an installation area of the A-pillar is narrow, in order to partially decrease a diameter of the airbag.

15 Claims, 5 Drawing Sheets

(51) Int. Cl.
*B60R 21/213* (2011.01)
*B60R 21/237* (2006.01)

(56) References Cited

U.S. PATENT DOCUMENTS

| | | | | |
|---|---|---|---|---|
| 6,565,118 | B2* | 5/2003 | Bakhsh et al. | 280/730.2 |
| 7,690,682 | B2* | 4/2010 | Wold | 280/743.1 |
| 7,703,798 | B2* | 4/2010 | Yamagiwa et al. | 280/728.2 |
| 7,735,863 | B2* | 6/2010 | Walston et al. | 280/749 |
| 7,748,741 | B2* | 7/2010 | Mitchell et al. | 280/743.2 |
| 7,762,578 | B2* | 7/2010 | Dix | 280/730.2 |
| 7,780,190 | B2* | 8/2010 | Yamagiwa et al. | 280/730.2 |
| 7,823,922 | B2* | 11/2010 | Mitchell et al. | 280/743.2 |
| 7,841,621 | B2* | 11/2010 | Dix | 280/730.2 |
| 8,025,309 | B2* | 9/2011 | Steinbach et al. | 280/730.2 |
| 8,282,124 | B2* | 10/2012 | Trovato et al. | 280/730.2 |
| 8,955,875 | B2* | 2/2015 | Maita | B60R 21/213 280/730.2 |
| 2001/0022441 | A1* | 9/2001 | Nakajima | B60R 21/213 280/730.2 |
| 2001/0026066 | A1 | 10/2001 | Tanabe et al. | |
| 2003/0006591 | A1* | 1/2003 | Yasuhara | B60R 21/04 280/730.2 |
| 2003/0178832 | A1* | 9/2003 | Dominissini et al. | 280/743.2 |
| 2004/0113401 | A1* | 6/2004 | Ryu | B60R 21/213 280/730.2 |
| 2004/0130128 | A1* | 7/2004 | Bakhsh et al. | 280/730.2 |
| 2004/0150198 | A1* | 8/2004 | Totsuka | B60R 13/025 280/730.2 |
| 2005/0057023 | A1* | 3/2005 | Burton et al. | 280/730.2 |
| 2007/0052225 | A1 | 3/2007 | Borje et al. | |
| 2007/0075530 | A1 | 4/2007 | Yokoyama | |
| 2007/0126214 | A1* | 6/2007 | Quach et al. | 280/730.2 |
| 2007/0210561 | A1* | 9/2007 | Yamagiwa | B60R 21/213 280/730.2 |
| 2007/0222192 | A1* | 9/2007 | Yamagiwa et al. | 280/730.2 |
| 2008/0079246 | A1* | 4/2008 | Dix | 280/730.2 |
| 2008/0106072 | A1* | 5/2008 | Walston et al. | 280/728.1 |
| 2008/0106084 | A1* | 5/2008 | Mitchell et al. | 280/743.2 |
| 2008/0284142 | A1* | 11/2008 | Cheal et al. | 280/730.2 |
| 2009/0278336 | A1 | 11/2009 | Minamikawa | |
| 2009/0322065 | A1* | 12/2009 | Wold | 280/743.1 |
| 2010/0225097 | A1* | 9/2010 | Trovato et al. | 280/730.2 |
| 2011/0127755 | A1* | 6/2011 | Beppu et al. | 280/730.2 |
| 2011/0278087 | A1* | 11/2011 | Okamoto | B60R 21/36 180/274 |
| 2012/0056409 | A1* | 3/2012 | Jun | B60R 21/232 280/728.1 |
| 2013/0062869 | A1* | 3/2013 | Ostman | 280/743.1 |
| 2014/0110923 | A1* | 4/2014 | Maita | B60R 21/213 280/730.2 |
| 2014/0312600 | A1* | 10/2014 | Verner | B60R 13/025 280/728.2 |

FOREIGN PATENT DOCUMENTS

| | | |
|---|---|---|
| EP | 2 112 032 A1 | 10/2009 |
| GB | 2 400 825 A | 10/2004 |
| JP | 2001-260795 A | 9/2001 |
| JP | 2004-4338439 A | 12/2004 |
| JP | 2007-091177 A | 4/2007 |
| JP | 2007-296928 A | 11/2007 |
| JP | 2009-269513 A | 11/2009 |
| JP | 2011-218877 A | 11/2011 |
| TW | I235120 B | 7/2005 |
| WO | 2004094198 A1 | 11/2004 |

OTHER PUBLICATIONS

International Search Report of PCT/JP2012/059407, Mailed May 22, 2012, 4 pages.

* cited by examiner

A-A Cross-section

B-B Cross-section (A)

Before deployment     Initial stage of inflation

B-B Cross-section (B)

Before deployment     Initial stage of inflation

B-B Cross-section

CURTAIN AIRBAG DEVICE

BACKGROUND

1. Field of the Invention

The present invention relates to a so-called curtain airbag device in which an airbag attached to a side portion of a vehicle interior is deployed between an occupant and a vehicle side wall to protect the occupant in the event of a crash.

2. Description of the Related Art

Airbag devices include various types of devices such as a driver seat airbag device that is accommodated inside the steering wheel, a curtain airbag device that is disposed along the upper edge of a window frame, and passenger airbag device that is disposed inside an instrument panel.

In general, a curtain airbag device includes a gas generator that generates inflation gas and an airbag (cushion) that is folded in an elongated form in an accommodated state and is deployed by gas supplied from the gas generator.

In general, a manufactured deployed airbag has a rod shape by being rolled up from the lower side in a roll form or a bellows form. The rod-shaped airbag is fixed to an upper portion of a window frame and a pillar. Although it is effective to narrow a pillar (in particular, the A-pillar) in order to improve the visibility in an automobile, it is difficult to narrow the pillar due to the presence of the airbag. There is a limit in forming the curtain airbag to be generally narrow when it is rolled in order to secure sufficient restraint area and strength. Moreover, clips for fixing a garnish and tether clips for fixing the tethers are also present in the pillar, which is a hindrance to narrowing of the A-pillar.

SUMMARY

In view of such a problem, an object of the present invention is to provide a curtain airbag device that can be applied to a small-width pillar.

In order to solve the problem, the present invention provides a curtain airbag device accommodated in a region extending from at least an A-pillar to an upper portion of a window frame, this device including: an airbag that is deployed in a curtain form near a side window of a vehicle interior in order to protect an occupant; and a gas generator that supplies inflation gas to the airbag. The airbag is formed in a rod shape by being folded in a roll form when the airbag is accommodated. When the airbag is accommodated, the airbag is partially compressed toward the center of the airbag at a narrow portion where an installation area of the A-pillar is narrow to partially decrease a diameter of the airbag. According to the present invention having such a configuration, it is possible to easily cope with an A-pillar having a small diameter.

Here, preferably, an initial inflating portion of the airbag is positioned on a body structure side of the A-pillar. Moreover, when the diameter of the airbag is decreased, the airbag may be pushed from a lower side so that the airbag has a U-shaped cross-section. In this case, preferably, the U-shaped portion in the cross-section is formed on a side close to a connecting structure that connects an A-pillar garnish and a weather strip. With such a structure, when the airbag is deployed, the airbag pushes the garnish as a highly rigid mass, and the airbag can be deployed (projected) toward the vehicle interior reliably and smoothly.

DETAILED DESCRIPTION

Figure 1:
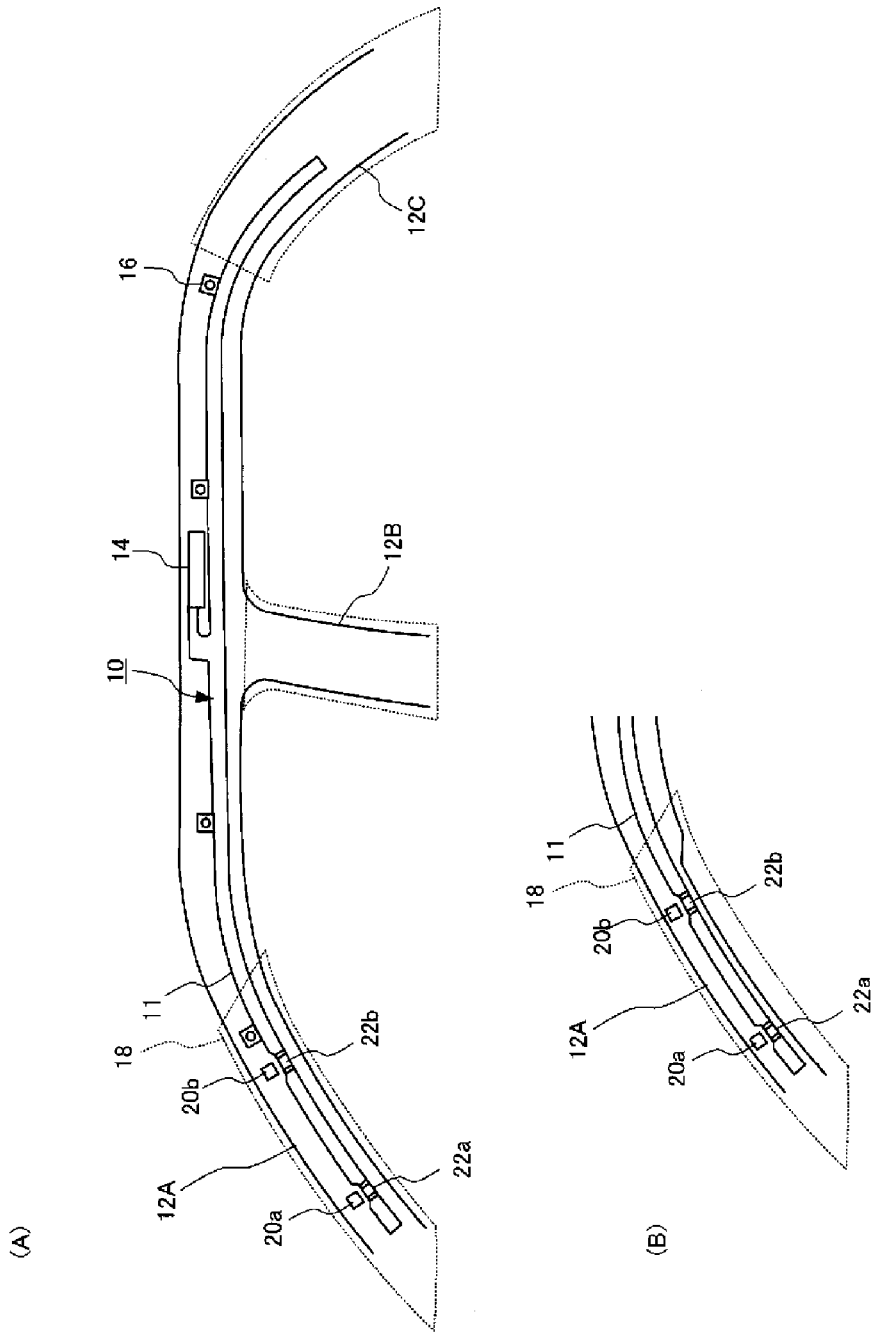
FIGS. 1A and 1B are explanatory diagrams illustrating an installation state of a curtain airbag device according to the present invention, illustrating the state excluding a pillar garnish.

Hereinafter, embodiments of the present invention will be described with reference to FIGS. 1A to 4. FIG. 1A illustrates an installation state of a curtain airbag device and illustrates the state excluding a pillar garnish.

A curtain airbag device according to an embodiment of the present invention includes an airbag 10 that is deployed in a curtain form near a side window of a vehicle interior, to thereby protect an occupant, and a gas generator 14 that supplies inflation gas to the airbag 10. The airbag 10 has a rod shape by being folded in a roll form when the airbag is accommodated. When the airbag 10 is accommodated, the airbag 10 is partially compressed toward the center of the airbag at a narrow portion where the installation area of the A-pillar 12A is narrow, thus forming small-diameter portions 22a and 22b where the diameter of the airbag 10 is decreased.

Figure 2:
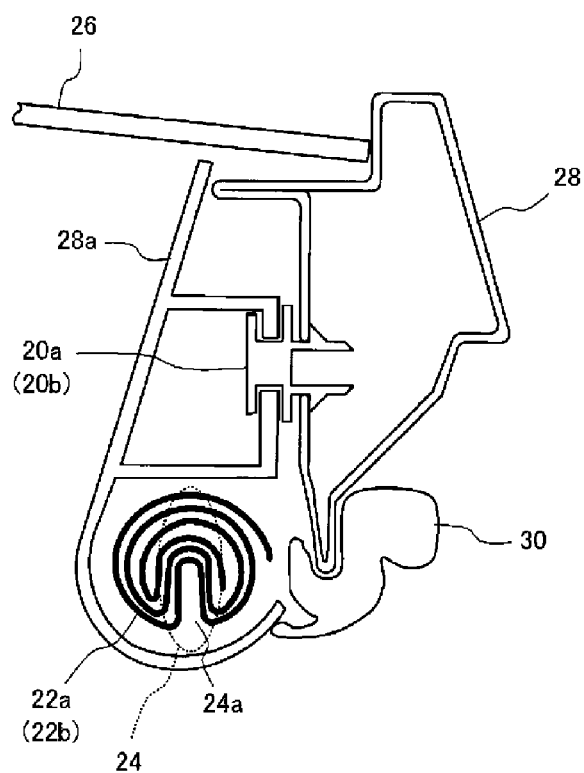
FIG. 2 is a diagram illustrating a cross-section of a curtain airbag according to an embodiment of the present invention.
Figure 3:
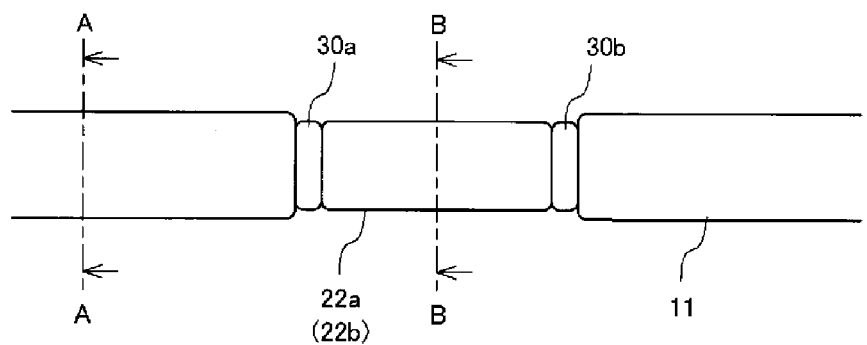
FIG. 3 is a plan view illustrating a structure of a main part of the curtain airbag according to the embodiment of the present invention.
Figure 4:
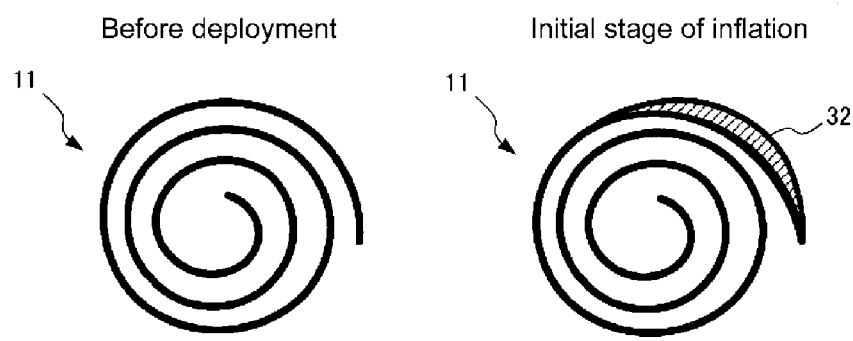
FIG. 4 illustrates cross-sections along lines A-A and B-B of FIG. 3.
Figure 4:
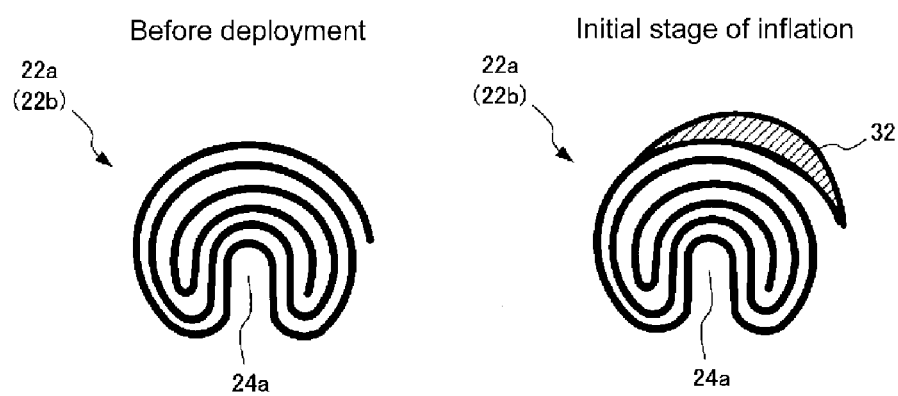

The narrow portion of the A-pillar includes a portion where garnish clips 20a and 20b are disposed and a portion where tether clips (not illustrated) are disposed. As illustrated in FIGS. 2 and 4, in the present embodiment, when the airbag is narrowed to have a small diameter, the roll-shaped airbag 10 is pushed (compressed) from the lower side using a jig (not illustrated) so as to have a U-shaped cross-section.

Figure 5:
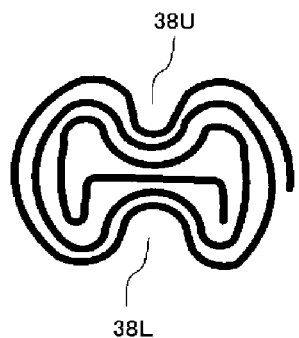
FIGS. 5A and 5B illustrate a cross-sectional structure of a curtain airbag according to another embodiment of the present invention and correspond to the position of line B-B of FIG. 3.
Figure 5:
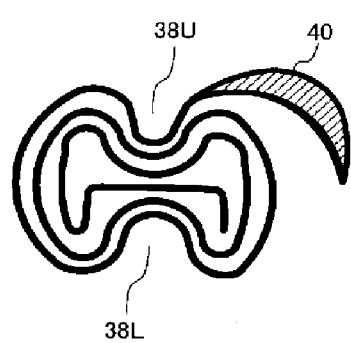
Figure 5:
Figure 5:
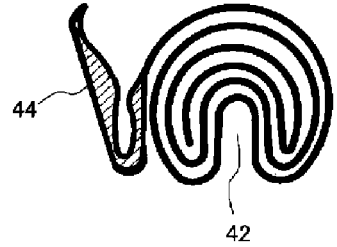

As illustrated in FIG. 5A, small-diameter portions 38U and 38L may be formed by pushing the airbag from the upper and lower sides. Moreover, as illustrated in FIG. 5B, the airbag may employ a so-called roll-plus-one structure in which the airbag is rolled and then folded once. In this case, a U-shaped portion 42 is formed on a body structure side (see FIG. 2) of the A-pillar. Reference numeral 44 indicates an initial inflating portion.

In order to partially decrease the diameter of the airbag 10, the diameter of the A-pillar 12A itself may be decreased as illustrated in FIG. 1B. In the present invention, initial inflating portions (end portions) 32 and 42 are disposed on the body structure side (see FIG. 2) of the A-pillar so that deployment behavior of the airbag is not greatly affected.

In FIGS. 1A and 1B, reference numeral 11 indicates a large-diameter portion (normal portion) of the airbag 10, and reference numerals 12B and 12C indicate a B-pillar and a C-pillar, respectively. Moreover, reference numeral 16 indicates an airbag attachment tab. Further, reference numeral 18 indicates a pillar garnish. In FIG. 2, reference numeral 26 indicates a window shield, reference numeral 28 indicates a roof side rail, and reference numeral 30 indicates a weather strip.

A U-shaped portion 24a in the cross-section of the airbag 10 is formed on a side close to a connecting structure that connects the A-pillar garnish 18 and the weather strip 30. Due to this, when the airbag 10 is deployed, the airbag 10 pushes the garnish 18 as a highly rigid mass, and the airbag 10 can be deployed (projected) toward the vehicle interior reliably and smoothly. This is because the U-shaped portion 24a has higher compressed density than the other portions and serves as a highly rigid structure.

When an emergency such a rollover, a side crash, or a lateral rollover occurs during traveling of a vehicle, a sensor included in the vehicle catches this abnormal vibration and sends an ignition signal to the inflator 14 based on that signal. The inflator 14 includes a propellant (not illustrated) that receives the ignition signal from the sensor to drive the inflator 14. In response to the operation of the inflator 14, inflation gas flows into the airbag 10 and the airbag 10 starts inflating. In this case, tapes 30a and 30b are broken and the airbag 10 is deployed downward along the window.

While the embodiment of the present invention has been described, the present invention is not limited to the embodiment, and various changes in design and the like can be made in a range without departing from the technical spirit described in the claims.

What is claimed is:

1. A curtain airbag device mounted on and extending upward along at least part of an A-pillar from a front end of a vehicle cabin to an upper portion of a window frame of a side window of a vehicle,
the device comprising:
an airbag having a curtain form in a deployed state near the side window of a vehicle interior in order to protect an occupant; and
a gas generator that supplies inflation gas to the airbag,
the airbag being formed in a rod shape by being provided in a roll form when the airbag is accommodated in a non-deployed state, and
part of the airbag mounted on the A-pillar and extending upwardly along the A-pillar, the A-pillar having a normal-width installation area and a narrow installation area, the normal-width installation area and the narrow installation area being longitudinally adjacent to each other along the A-pillar, and in the non-deployed state the part of the airbag extending upwardly along the A-pillar having a large-diameter portion in the normal-width installation area and having a small-diameter portion in the narrow installation area, the small-diameter portion of the airbag being partially compressed relative to the large-diameter portion toward a center of the roll form of the airbag to form the small-diameter portion by partially decreasing a diameter of a localized portion of the part of the airbag extending upward along the A-pillar, with tape bordering the small-diameter portion, the tape placed in a location where the small-diameter portion transitions into the large-diameter portion.

2. The curtain airbag device according to claim 1, wherein an initial inflating portion of the airbag is positioned on a body structure side of the A-pillar.

3. The curtain airbag device according to claim 1, wherein when the diameter of the airbag is partially decreased, the diameter is reduced from upper and lower sides of the airbag in the non-deployed state.

4. The curtain airbag device according to claim 1, wherein a garnish clip is disposed adjacent to the small-diameter portion.

5. The curtain airbag device according to claim 1, wherein the small-diameter portion of the airbag is pushed toward the center of the roll from a lower side so that the airbag has a U-shaped cross-section.

6. The curtain airbag device according to claim 5, wherein the U-shaped cross-section is formed on a side of a connecting structure that connects an A-pillar garnish and a weather strip.

7. In a motor vehicle having an A-pillar extending from a front end of a vehicle cabin upward to an upper portion of a window frame of a side window of the vehicle, an airbag device comprising:
an airbag having a rolled form in a non-deployed state and a curtain form in a deployed state;
a gas generator coupled to the airbag, the gas generator configured to generate inflation gas and inflate the airbag from the non-deployed state to the deployed state where the airbag extends along an interior of the side window of the vehicle; and
in the non-deployed state, at least part of the airbag being installed on the A-pillar and extending upward along at least a portion of the A-pillar between opposing ends of the A-pillar, the part of the airbag installed on and extending upward along the at least a portion of the A-pillar between the opposing ends of the A-pillar including both a large-diameter portion and a small-diameter portion longitudinally adjacent to each other between the opposing ends of the A-pillar, the small-diameter portion of the airbag having a localized reduced diameter relative to the large-diameter portion of the airbag between the opposing ends of the A-pillar, with tape bordering the small-diameter portion, the tape placed in a location where the small-diameter portion transitions into the large-diameter portion.

8. The airbag device of claim 7, wherein the small-diameter portion is formed by a radially compressed portion of the airbag.

9. The airbag device of claim 7, wherein the A-pillar has a reduced width portion along a length thereof and the small-diameter portion of the airbag is located in the reduced width portion of the A-pillar.

10. The airbag device of claim 7, further comprising a garnish and the small-diameter portion being provided adjacent to a garnish clip configured to attach the garnish to the A-pillar.

11. The airbag device of claim 7, wherein the airbag includes an initial inflation portion and the initial inflation portion is located on a body structure side of the A-pillar.

12. The airbag device of claim 7, wherein the small-diameter portion of the airbag has a U-shaped cross-section.

13. The airbag device of claim 12, wherein the U-shaped cross-section has an open end, the open end being oriented in a downward direction relative to the vehicle.

14. The airbag device of claim 12, wherein the small-diameter portion of the airbag has a dual U-shaped cross-section.

15. The airbag device of claim 14, wherein the dual U-shaped cross section has opposed open ends, one of the opposed open ends being oriented in a downward direction relative to the vehicle.

* * * * *